United States Patent [19]

Nakanishi et al.

[11] Patent Number: 4,544,826
[45] Date of Patent: Oct. 1, 1985

[54] METHOD AND DEVICE FOR CONTROLLING WELDING POWER SUPPLY TO AVOID SPATTERING OF THE WELD MATERIAL

[75] Inventors: Sadao Nakanishi; Yoshihiro Nakajima; Hitoshi Kawano, all of Ise; Akihiko Ihochi, Odawara; Takaaki Ogasawara, Yokohama; Tokuji Maruyama, Nagaodai, all of Japan

[73] Assignees: Kabushiki Kaisha Kobe Seiko Sho, Kobe; Shinko Electric Co., Ltd., Tokyo, both of Japan

[21] Appl. No.: 606,996

[22] Filed: May 3, 1984

[30] Foreign Application Priority Data

May 4, 1983 [JP] Japan .................................. 58-78665

[51] Int. Cl.⁴ ................................................ B23K 9/09
[52] U.S. Cl. .............................. 219/137 PS; 219/123; 219/130.21; 219/130.51
[58] Field of Search ..................... 219/137 PS, 130.21, 219/130.51, 123

[56] References Cited

U.S. PATENT DOCUMENTS

| | | | |
|---|---|---|---|
| 3,792,225 | 2/1974 | Needham et al. | 219/130.21 |
| 3,809,853 | 5/1974 | Manz | 219/103.21 |
| 4,366,362 | 12/1982 | Ohta et al. | 219/137 PS |
| 4,456,813 | 6/1984 | Mizuno et al. | 219/130.21 |

Primary Examiner—Clifford C. Shaw
Attorney, Agent, or Firm—Oblon, Fisher, Spivak, McClelland & Maier

[57] ABSTRACT

A method and a device for controlling a welding power supply, employing a control device essentially including a first switch means consisting of at least one switch in element to be turned on and off to control the output current of the power supply, second switch means adapted to be inserted in a welding current attenuating path when the first switch means is in off state, and an impedance means consisting of at least one impedance element connected parallel with the second switch means.

4 Claims, 27 Drawing Figures

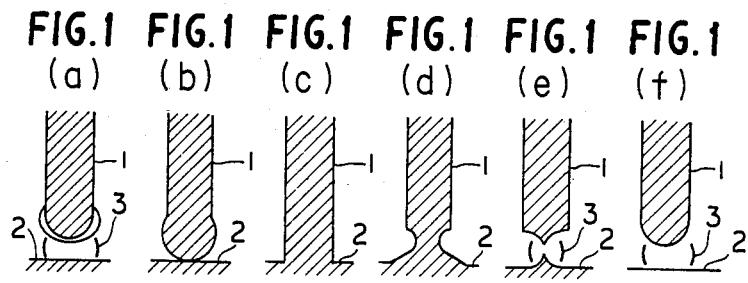
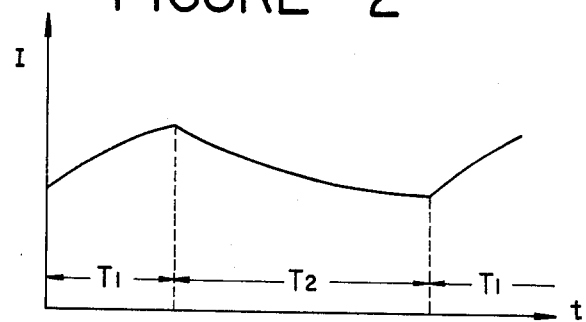
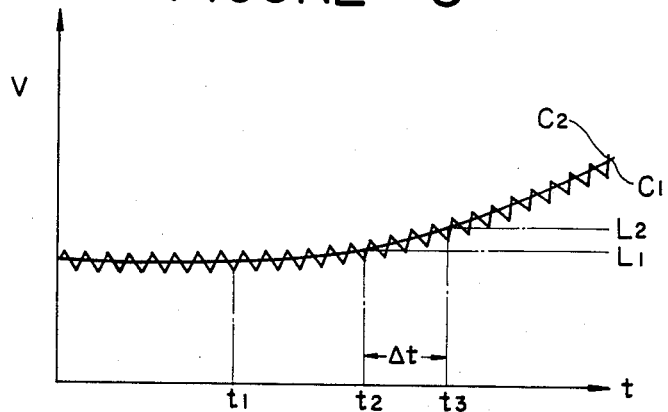

METHOD AND DEVICE FOR CONTROLLING WELDING POWER SUPPLY TO AVOID SPATTERING OF THE WELD MATERIAL

BACKGROUND OF THE INVENTION

1. Field of the Invention

This invention relates to improvement in welding power supply, and more particularly to control of a power supply capable of achieving reductions of output current with a high response. More precisely, the invention contemplates to provide a method and device for controlling a power supply, useful for suppressing spatters in consumable electrode arc welding or for producing a weld of high quality in TIG welding.

2. Description of the Prior Art

In consumable arc electrode welding, there have been experienced various problems caused by spattering, e.g., a reduction of welding wire deposit efficiency, a drop of operational efficiency due to the necessity for removing scattered spatters, etc. Therefore, it has been a matter of great concern to suppress the spattering to a minimum. In order to analyze the factors which give rise to spattering, FIGS. 1(a) to 1(f) illustrate the sequential phases through which a molten droplet of a consumable electrode (hereinafter referred to as "welding wire") is transferred. In these figures, indicated at 1 is a welding wire, at 2 a workpiece, and at 3 an arc, showing: at (a) a phase immediately before short circuiting, in which an arc is generated across the gap; at (b) a phase in an initial part of short circuiting, in which a molten droplet comes into contact with a weld pool; at (c) a phase in a middle part of short circuiting, in which the molten droplet is securely in contact with the weld pool; at (d) a phase in the final part of short circuiting, in which "necking" occurs between the welding wire and the molten droplet as a result of transfer of the droplet to the weld pool; at (e) an instant of restriking an arc by the rupture of the short circuit; and at (f) a phase of re-arcing in which the distal end of the welding wire begins to fuse and a molten droplet grows. During a welding operation, the phases of FIGS. 1(a) to 1(f) take place repeatedly. Under these circumstances, spattering occurs at the moment of restriking an arc 3 by the rupture of the short circuit, namely, in the phase of FIG. 1(e), and, as well-known in the art, spattering occurs in a greater amount with a larger welding current at the moment of re-arcing.

In this connection, the power supplies which are generally employed in this sort of welding operations are DC power supplies of constant voltage characteristics, supplying welding current of the waveform as shown in FIG. 2 in which period T1 is a short circuit period (cf. FIGS. 1(b) to 1(d)) and period T2 is an arc period. As seen therefrom, the welding current is increased in the short circuit period T1 at a rate as determined by a time constant of an electric circuit for that period, and reduced in the arc period T2 at a rate as determined by a time constant for that period. Accordingly, the welding current of the conventional power supply reaches a peak at the moment of the rupture of short circuit or the moment or restriking an arc (FIG. 1(e)) when spattering takes place, thus performing a welding operation in a condition which is most susceptible to spattering. Therefore, a welding operation by the use of a conventional power supply suffers from a large amount of spattering, giving rise to various problems such as blocking of shielding gas flow by deposition of scattered spatters on the shielding gas nozzle, lowering the mechanical strength of the weld by entrainment of nitrogen or air into the molten metal.

In order to solve this problem, it has been proposed to use as a shielding gas a mixture of an inert gas (e.g., He, Ar or the like) and an active gas (e.g., CO or the like) thereby to prevent spattering. However, this method has been found to have no practical effect on the suppression of spattering unless either the welding current is greater than a certain value or the droplets are transferred in a state of a spray in free movement. On the other hand, there has thus far been employed a measure of lowering the welding current at the re-arcing time by suitably presetting the resistance and inductance of an electric circuit in welding operations to adjust the increasing and decreasing rates of the welding current in the short circuit period T1 and arcing period T2 of FIG. 2. However, the values of the resistance and inductance vary to a considerable degree depending upon the welding condition, so that it is extremely difficult to preset their values and this measure cannot be practically resorted to for the prevention of spattering.

Thus, the conventional spatter preventing means all fail to serve as a drastic remedy to the problem of spattering or to attain improvements in any substantial degree in this regard.

SUMMARY OF THE INVENTION

With the foregoing situations in view, the present invention has as its object the provision of a method and a device for controlling a welding power supply which can overcome the above-mentioned problems or difficulties.

It is a more particular object of the present invention to provide a method and a device for controlling a power supply in consumable electrode arc welding, capable of reducing output current sharply with a quick response to suppress spattering to a minimum.

It is another object of the present invention to provide a method and a device for controlling an arc deflecting and wire heating power supply in TIG welding, capable of controlling the output current sharply to produce welds of high quality.

According to the present invention, there are provided a method and a device for the control of welding power supply, essentially comprising: first switch means consisting of a plural number of switching elements to be turned on and off to control the output current of the power supply; second switch means to be inserted in a welding current attenuating path when the first switch means is turned off; and an impedance element connected parallel with the second switch means.

The method and device of the present invention have a quick response in output current attenuation, so that it becomes possible to suppress spatters to a minimum in consumable electrode arc welding or to form welds of high quality in TIG welding.

The above and other objects, features and advantages of the present invention will become apparent from the following description and appended claims, taken in conjunction with the accompanying drawings which show by way of example some illustrative embodiments of the invention.

BRIEF DESCRIPTION OF THE DRAWINGS

In the accompanying drawings:

FIGS. 1(a) to 1(f) are schematic views showing sequential phases through which a droplet of a welding wire is transferred;

FIG. 2 is a waveform diagram of welding current of a power supply with constant voltage characteristics;

FIG. 3 is a diagram showing sampling voltage levels for the detection of a "necking" phenomenon;

DESCRIPTION OF PREFERRED EMBODIMENTS

Figure 4:
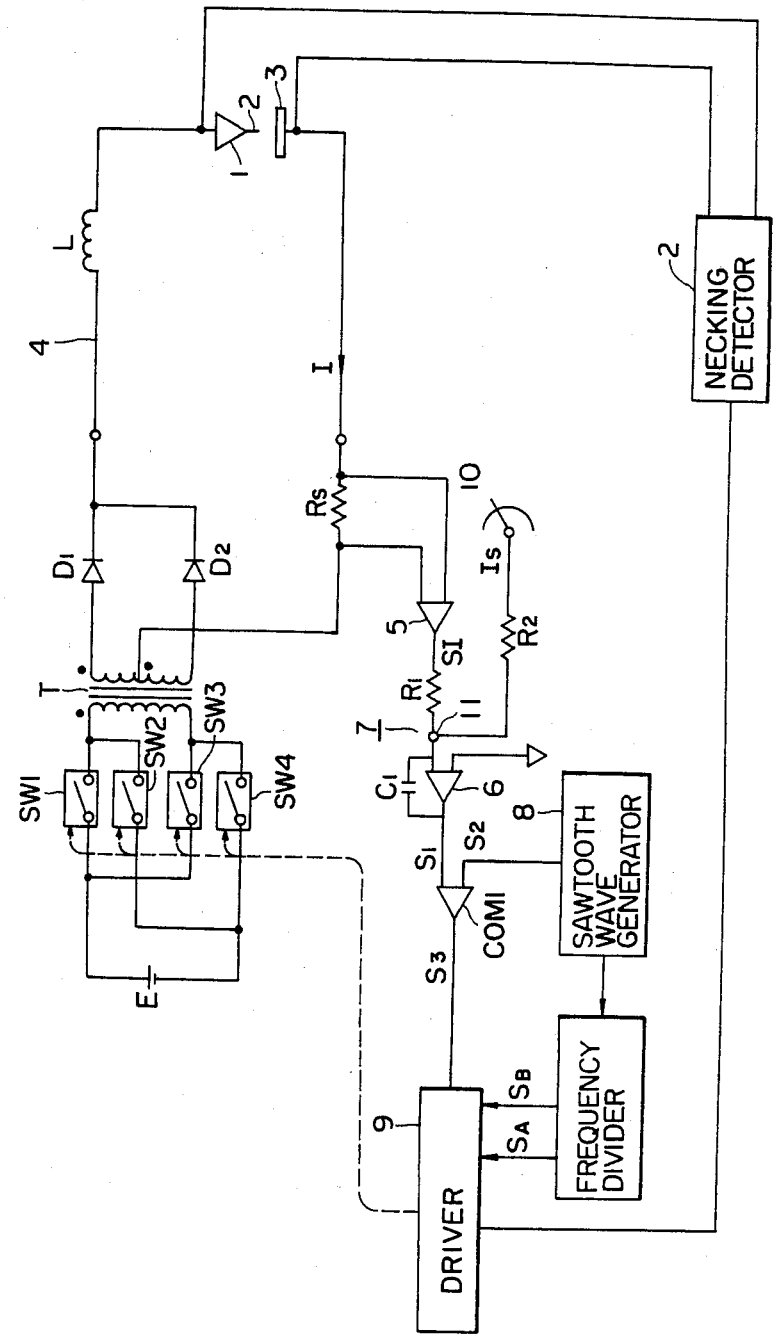
FIG. 4 is a block diagram showing the arrangement of an ordinary inverted type welding power supply.

The present invention is based on the following principles. As mentioned hereinbefore, the amount of spattering is proportional to the value of welding current at the moment of re-arcing (in the phase of FIG. 1(e)). It follows that the spattering can be suppressed by reducing the welding current at that time point. In order to control the welding current to this effect, it is necessary for the control to be able to predict the re-arcing time point accurately and to lower the current promptly. For this purpose, the power supply control according to the present invention is arranged to predetect the re-arcing time point securely by electrically detecting the phenomenon of "necking" which occurs to the molten metal bridge as shown in FIG. 1(d) immediately before restriking an arc, and to lower the welding current promptly in time with the re-arcing.

In this connection, the "necking" can be electrically detected by the following methods. Firstly, whether or not the electrode is in short circuiting or arcing state is detected from the level of voltage across a load (or across a gap between a torch and a workpiece), controlling the welding current at a certain level if in short circuiting state. Now, if "necking" occurs to the electrode, the load resistance is increased due to a reduction of the sectional area of the electrode and therefore the voltage across the load is increased correspondingly to the increment in the load resistance. Accordingly, the "necking" can be detected from the increment of load voltage. However, although the increment of resistance immediately after occurrence of "necking" is about 10%, the S/N ratio in the detection of the increment in resistance is considerably lowered by the ripple components in the welding current which are attributable to the on-off frequency of switching elements of the power supply. Therefore, the sampling level for the discrimination of "necking" is required to have a relatively wide margin. For example, on necking the voltage V varies as shown in FIG. 3, and the level of discrimination which may be at L1 in a case free of ripple components (curve C1) has to be raised to L2 when ripple components (meandering curve C2) are present, in order to avoid control errors. This means that the time point of detection is delayed at $\Delta t$ as compared with that at level L1. In the graph of FIG. 3, t1 is a time point when "necking" commences, t2 is a time point of detection of the "necking" at level L1, and t3 is a time point of detection of the "necking" at level L2.

Thus, the time point of detecting "necking" is delayed from an actual time point of commencement of "necking" which takes place only about 500 $\mu s$ before re-arcing in many cases. Consequently, the welding current has to be lowered within an extremely short time period of 500 $\mu s$ minus the time delay of detection to achieve a sufficient reduction of the welding current before the re-arcing time point since otherwise the suppression of spattering cannot be expected in any substantial degree. Hereafter, this point is discussed more particularly.

Figure 5:
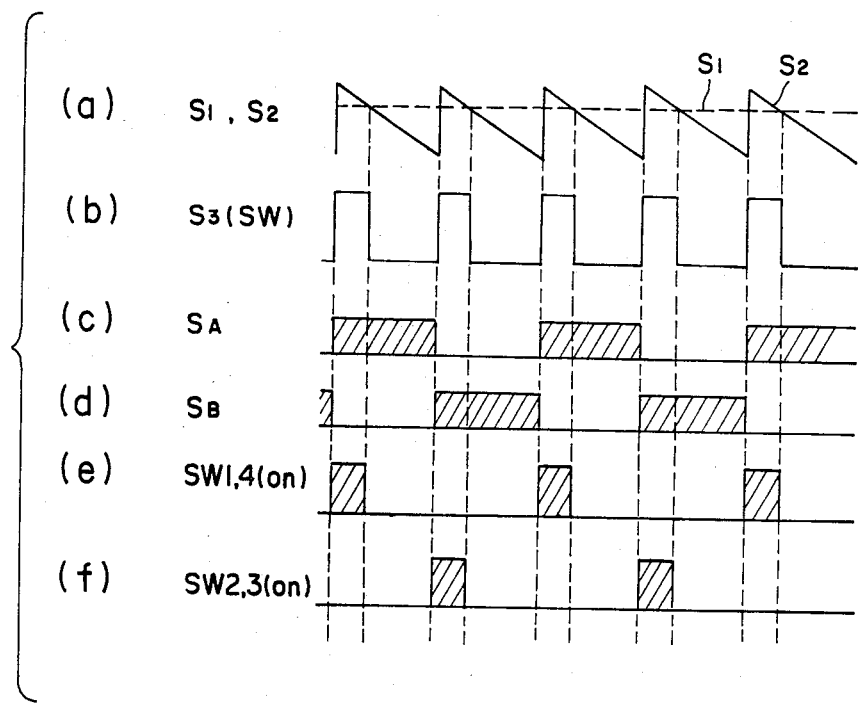
FIGS. 5(a) to 5(f) are diagrams showing waveforms appearing at various parts of the circuit shown in FIG. 4.

Referring to FIG. 4, there is shown a block diagram of an inverter type welding power supply which are used in general, in which indicated at 1 is a torch, at 2 a welding wire, and at 3 a workpiece. The welding wire 2 is successively fed by a wire feeder, not shown, at a suitable feed rate according to its rate of consumption. Indicated at L is a floating inductance which occurs in a welding cable 4, at D1 and D2 are rectifying diodes, and at Rs is a shunt resistance for detecting the welding current. Further, denoted at E is a DC power source, at SW1 to SW4 are switching elements, and at T is a transformer. The voltage across the shunt resistance Rs is amplified by an operational amplifier 5 which produces at its output terminal a detected welding current SI. This current signal SI is fed to an integrating circuit 7 which is constituted by resistance R1, capacitor C1 and an operational amplifier 6. Output signal S1 (FIG. 5(a)) of the integrating circuit 7 is fed to a comparator COM1 which also receives sawtooth wave signal S2 of a predetermined frequency (FIG. 5(a)) from a sawtooth wave generator 8. Shown at 9 is a driver which turns on and off the switching elements SW1 to SW4 according to the output signal S3 (FIG. 5(b)) of the comparator COM1 and output signals SA and SB (FIG. 5(c) and 5(d)) of a frequency divider 13. In the particular embodiment shown, the switches SW1 and SW4 are driven as a pair and the switches SW2 and SW3 as another pair (FIGS. 5(e) and 5(f)). Designated at 10 is a variable resistance which presets the welding current in short circuiting condition, and its signal of a preset value is fed to a deviation detection point 11 through resistance R2. In this circuit arrangement, the on-off of the switches SW1 to SW4 are controlled such that the value of deviation at the deviation detecting point 11 is zeroized, thereby to conform the welding current I with the signal of preset value Is. In the arcing condition, this circuit operates to provide constant voltage control or constant current control according to a preset value, but the explanation on this point is omitted since it is known in the art.

In a case where the above-described control circuit is provided wtih a necking detector 12 to detect "necking" from a variation in the voltage across the load, the welding current can be lowered by stopping the operation of the driver 9 in response to an output signal of the necking detector 12 to turn off all of the switches SW1 to SW4. Now, when the switches SW1 to SW4 are turned off upon detection of "necking" by the necking detector 12, the welding current is attenuated through a loop of work 3→shunt resistance Rs→diode D1 (D2)→inductance L→torch 1→welding wire 2→work 3, according to the following equation:

$$I(t) = I \cdot e^{-R/L \, t} \quad (1)$$

(in which I is initial value of welding current at the instant when switches Sw1 to SW4 are turned off, and R is resistance of the electrode in short circuiting condition including shunt resistance Rs.) Considering that a welding cable normally has a length of 30 m, there exists an inductance L which is greater than 50 μH and cannot be smaller than that. Further, the value of resistance R of the electrode is about 200 mΩ when its diamter is 1.2 mm, and the initial value I is about 400A at the end of short circuiting period in general. Therefore, substituting these values into Eq. (1), we obtain $$I(t) = 400 \cdot e^{-20 \, m\Omega/500 \, \mu H \cdot t} \quad (2)$$

and substituting into Eq. (2) the time 500 μs from commencement of "necking" to re-arcing, we obtain $$I(500 \, \mu s) = 400 \cdot e^{-0.2} = 327 \, [A] \quad (3)$$

However, in order to suppress spattering, the welding current at the time of re-arcing has to be lowered below 150 A, so that it is difficult to expect any effect on the suppression of spattering simply by turning off the switches SW1 to SW4 of the above-described circuit upon detection of necking.

Therefore, according to the present invention, resistance is inserted in the current attenuating loop upon detection of necking to accelerate the speed of current attenuation.

Figure 6:
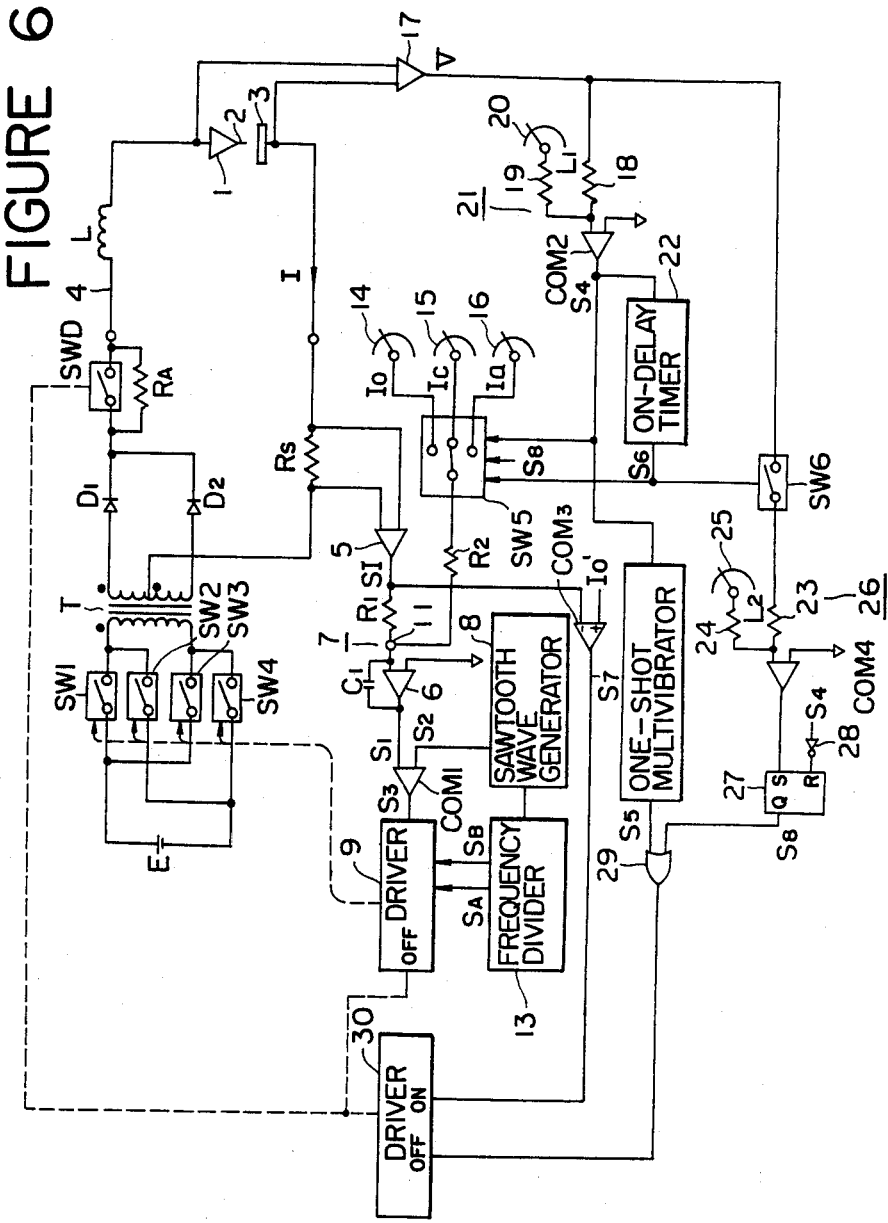
FIG. 6 is a block diagram showing a circuit arrangement according to the present invention.

FIG. 6 is a block diagram of a welding power supply embodying the present invention in which the component parts common to FIG. 4 are designated by like reference characters and their description is omitted to avoid repetition.

Figure 7:
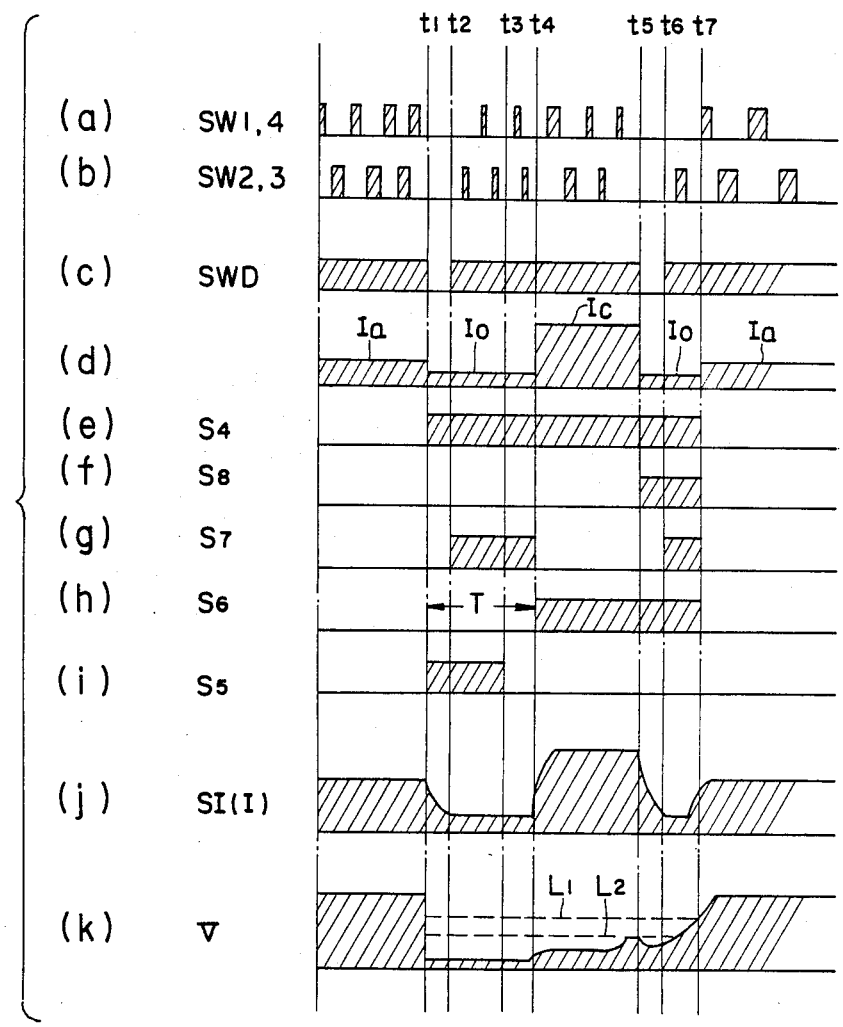
FIGS. 7(a) to 7(f) are diagrams of waveforms appearing at various parts of the circuit shown in FIG. 6.

In FIG. 6, indicated at 14 is a variable resistance which presets the control value of the welding current in the initial and final parts of the short circuiting period, at 15 a variable resistance which presets the control value of the welding current in the middle part of the short circuiting period, and at 16 a variable resistance which presets the control value of the welding current in the arcing period, the control values Io, Ic and Ia of these resistances being selected by a switching element SW5 and fed to a deviation detecting point 11 through a resistance R2. The reference numeral 17 denotes an amplifier which detects and amplifies the voltage across the welding circuit between a torch and a work, and its output signal is fed to a short circuit detector 21 and at the same time to a necking detector 26 through a switching element SW6. The short circuit detector 21 is constituted by a variable resistance 20 which presets a short circuit detection level L1, resistances 18 and 19, and a comparator COM2, turning its output signal S4 to "high" level when the output level of the amplifier 17 drops below the level L1. The necking detector 26 is constituted by a variable resistance 25 which presets a necking detection level L2 (L1>L2), resistances 24 and 23, and a comparator COM4, turning its output signal to "high" level when the output signal of the amplifier which is received through the switching element SW6 rises over the level L2. Denoted at 22 is an on-delay timer which turns its output signal to "high" level upon lapse of a preset time T (a time duration for stabilization of the short circuit), and at 23 a one-shot multivibrator which produces a pulse signal S5 (FIG. 7(i)) on the rise of the signal S4. Indicated at 27 a set-reset flip-flop (hereinafter referred to as "FF" for brevity), at 28 an inverter for resetting FF 27, and at 29 an OR gate. On the other hand, a comparator COM3 turns its output signal S7 to "high" level when the welding current I drops below the preset value Io' which is slightly larger than the control value Io. Designated at SWD is a switching element which is provided between a diode D1 (D2) and a welding cable, and at RA a resistance which is connected parallel with the switching element SWD. A driver 30 which controls on-off of the switching element SWD turns its output signal to "low" level (SWD off) on the rise of a signal fed to its OFF terminal and to "high" level (SWD on) on the rise of the signal S7 fed to its ON terminal. Further, the output signal of the driver 30 is fed to an OFF terminal of the driver 9, which turns off all of the switching elements SW1 to SW4 upon receipt of a "low" level signal at its OFF terminal.

The above-described welding current control circuit according to the invention operates in the following manner.

Referring to FIGS. 7(a) to 7(k) which illustrate waveforms of signals appearing at various parts of the circuit of FIG. 6, the current control value is set at Ia as shown at (d) before the time point t1 (in arcing state), as a result controlling on-off of the switching elements SW1 to SW4 in a manner to equalize the welding current with a value corresponding to Ia. Upon short circuiting at the time point t1, the output voltage of the amplifier 17 is dropped below the level L1 (FIG. 7(k)). Consequently, the output signal S4 of the short circuit detector 21 is turned to "high" level and this signal is fed to the switching element SW5 to change the current control value to Io, and the one-shot miltivibrator 23 produces a pulse signal S5 as shown at (i). By the pulse signal S5, OFF terminal of the driver 30 is turned to "high" level, and therefore its output signal is turned to "low" level, thereby turning off the switching element SWD. At the same time the switching elements SW1 to SW4 which are driven by the driver 9 are all turned off. As a result, the welding current I is attenuated through a path of work 3—shunt resistance Rs→diode D1 (D2)→resistance RA→electrode 2. In this instance, the current attenuating speed is accelerated markedly by the insertion of the SWD and resistance RA, as will be explained hereinlater. Nextly, if the welding current I drops below a value corresponding to the present value Io' at the time point t2, the output signal of the comparator COM3 is turned to "high" level, raising the ON terminal of the driver 30 to "high" level. Whereupon, the output signal of the driver 30 is turned to "high" level, turning on the switching element SWD again and controlling on-off of the switching elements SW1 to SW4 in a manner to equalize the welding current to Io. Then, the output signal of the one-shot multivibrator 23 is stopped at the time point t3, and succeedingly the output signal S6 of the on-delay timer 22 rises at the time point t4 (FIG. 7(h)). On the rise of the signal S6, the switching element SW5 selects the control value Ic, and the switching element SW6 is turned on to feed the output signal of the amplifier 17 to the necking detector 26. As soon as "necking" occurs to the welding wire 2, the output voltage of the amplifier 17 is increased and, if the voltage increment exceeds the level L2 at the time point t5, the output signal of the necking detector 26 is turned to "high" level to set FF 27 and turn the signal S8 to "high" level (FIG. 7(f)). Consequently, the OFF terminal of the driver 30 is raised to "high" level and its output signal is dropped to "low" level, turning off the switching element SWD and SW1 to SW4. Accordingly, the welding current is attenuated through the same path as in the time period t1-t2. As FF 27 is set, the switching element SW5 selects the control value Io again, and, when the welding current drops below the preset value Io' at the time point t6, the output signal of the comparator COM3 is turned to "high" level. As a result, the ON terminal of the driver 30 is raised to "high" level, and its output signal is turned to "high" level to turn on the switching element SWD, controlling on-off of the switching elements SW1 to SW4 according to the control value Io. Then, at the time point t7 which is about 100 μs behind the time point t6, the arc is restriken and therefore the output voltage of the amplifier 17 exceeds the level L1. Accordingly, the signal S4 is turned to "low" level to let the switching element SW5 select the control value Ia and reset FF 27. Thereafter, the above-described operation is repeated.

With regard to the functions of the switching element SWD and resistance RA in the above-described operation, if the value of RA is 19 times greater than the electrode resistance R=20 mΩ, namely, 0.38Ω, the time constant of the welding current attenuation is $L(RA+R)=50$ μH/0.4Ω=125 μs, and Eq. (1) is written as $$I(t) = I \cdot e^{-0.4/50 \times 10^{-6} \times t} \quad (4)$$

If I=400 A and t is 150 μs, for example, $$I(150 \mu s) = 400 \cdot e^{-1.2} = 120 \, (A) \quad (5)$$

Thus, it will be understood that, even if t is as small as 150 μs, the welding current can be lowered to a value which has an effect on the suppression of spattering. In this instance, there may be employed, in place of resistance RA, a Zener diode, a series circuit of a capacitor with discharge resister or any other means which consumes energy.

Now, with regard to the function of the switching element SWD, if the operating frequency of the switching elements SW1 to SW4 is 10 kHz when the switching element SWD is on, the welding current at the end of the switching period is expressed by $$I = 400 \cdot e^{-20 \, m\Omega/50 \, \mu H \times 100 \, \mu s} = 400 \cdot e^{-0.004} = 384 \, (A) \quad (6)$$

and the ripple becomes smaller than 16 A as expressed by the following equation.

$$400 - 384 = 16 \, (A) \quad (7)$$

This means that there is only a ripple of 4% absolute value, which is practically acceptable in the detection of "necking" from the voltage across the load. As seen in FIG. 3, with a greater ripple, it becomes necessary to raise the necking detecting level, in some cases resulting in a large delay of the detection of necking, which is unacceptable in practical application. Considering now the loss at resistance RA (the energy of L absorbed by RA), since the frequency of short circuiting of the electrode is about 50 per second in welding operation, the loss WRA1 in the period of t5 to t6 is expressed by $$W_{RA1} = \frac{1}{2} \times 50 \, \mu H \times (400^2 - 120^2) \times 50 = 182 \, W \quad (8)$$

and, if the current in arcing circuiting condition is 200 A the loss in the period of t1 to t2 is expressed by $$W_{RA} = \frac{1}{2} \times 50 \, \mu H \times (200^2 - 120^2) \times 50 = 32 \, W \quad (9)$$

Therefore, the total loss Wtotal in the above-described embodiment is a practical value of $$W\text{total} = 182 + 32 = 214 W \quad (10)$$

On the other hand, in a case where the switching element SWD is absent in the circuit (in a case where resistance RA alone is inserted in the current attenuating circuit), the ripple in the short circuiting condition becomes too large to detect "necking". In order to reduce the ripple to about 15 A, the switching elements SW1 to SW4 are practically required to have an operating frequency higher than 100 kHz. Besides, without the switching element SWD, the loss at the resistance RA becomes larger than several tens kw which is unacceptable in practical applications.

Thus, the switching element SWD contributes to the reductions of the ripple and the loss of electric energy, while the resistance RA contributes to the improvement of the current attenuating speed.

In the above-described embodiment, the welding current is sharply reduced not only upon occurrence of necking but also in a period immediately after short circuiting (in the period of t1 to t2 in FIG. 7), so that it is possible to suppress spattering which would otherwise be caused by a current increase in that period. Further, since the switching element SWD is turned on when the welding current drops below the preset vlaue I'o to provide an efficient control free of arc extinctions which might occur at the time of re-arcing due to excessive current drops.

Figure 8:
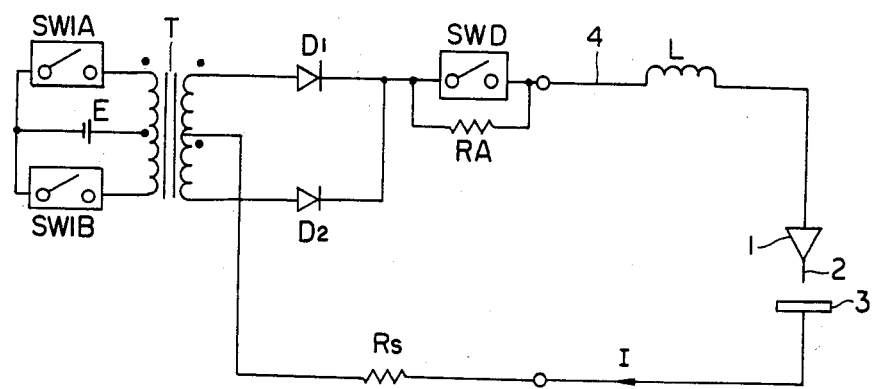
FIG. 8 is a block diagram of a modified circuit arrangement.

Instead of the switching elements SW1 to SW4, there may be employed switching elements SW1A and SW2A as shown in FIG. 8. In this case, the switching element SW1A is operated in the same time as the switching elements SW1 and SW4, and the switching element SW2A in the same time as the switching elements SW2 and SW3.

Figure 9:
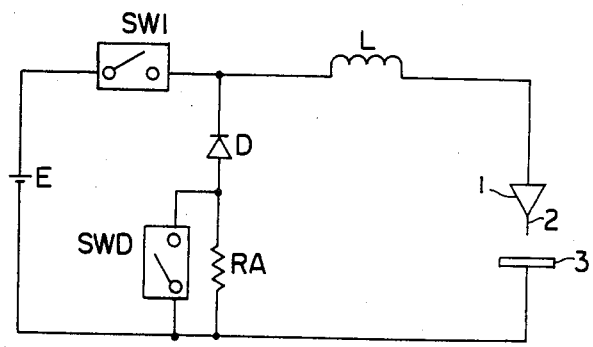
FIG. 9 is a block diagram of a chopper type power supply incorporating the present invention.

The present invention is of course applicable to a chopper type power supply, and an example is shown in FIG. 9.

Further, the principles of the invention can be applied to the control of a welding power source for arc deflection and wire heating in TIG welding.

It is known in the art that in TIG welding a weld of high quality can be obtained through arc oscillation, varying the arc deflection by changing the value of current flow through a wire. It is also known that this effect can be enhanced by raising the frequency of oscillation. However, conventional power supplies have a problem that a current drop is slow as compared with a current rise due to the inductance of external wiring, a large internal reactor provided for minimization of ripples and a low load resistance by short circuiting of wire and work at the weld pool, causing a difference in speed between forward and reverse oscillatory motions. In addition, the frequency of oscillation is limited to ten and several Hz since the average current increases with the frequency of oscillation and restoration of a suitable average current will result in insufficient effect of oscillation.

Figure 10A:
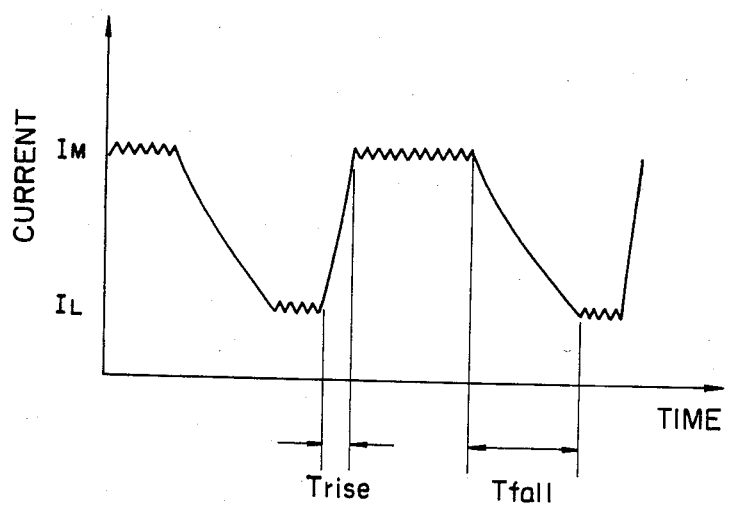
FIGS. 10(a) and 10(b) are waveform diagrams of output current of the conventional power supply and output current of a power supply according to the invention.
Figure 10B:
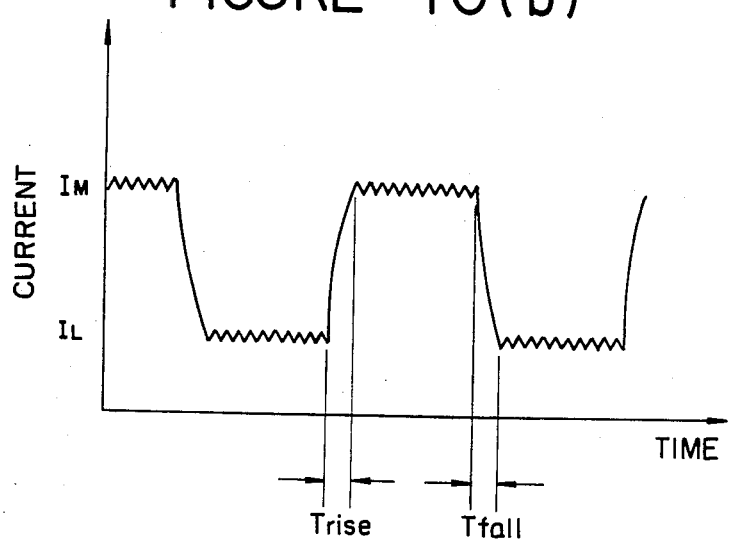

Shown in FIG. 10(a) is the waveform of output current of the conventional power supply, and in FIG. 10(b) the waveform of output current of a power supply according to the present invention. As seen in FIG. 10(a), the rising time Trise is shorter than a fall time Tfall, and the average current is high in the case of the conventional power supply.

According to the invention, it becomes possible to provide a power supply with Trise=Tfall by turning off first and second switch means at the time point of switching the current from a high level IH to a low level IL. Therefore, even if the frequency is increased with the levels IH and IL in fixed state, it is possible to hold the average current unchanged to equalize the speeds of forward and reverse oscillatory motions.

Figure 11:
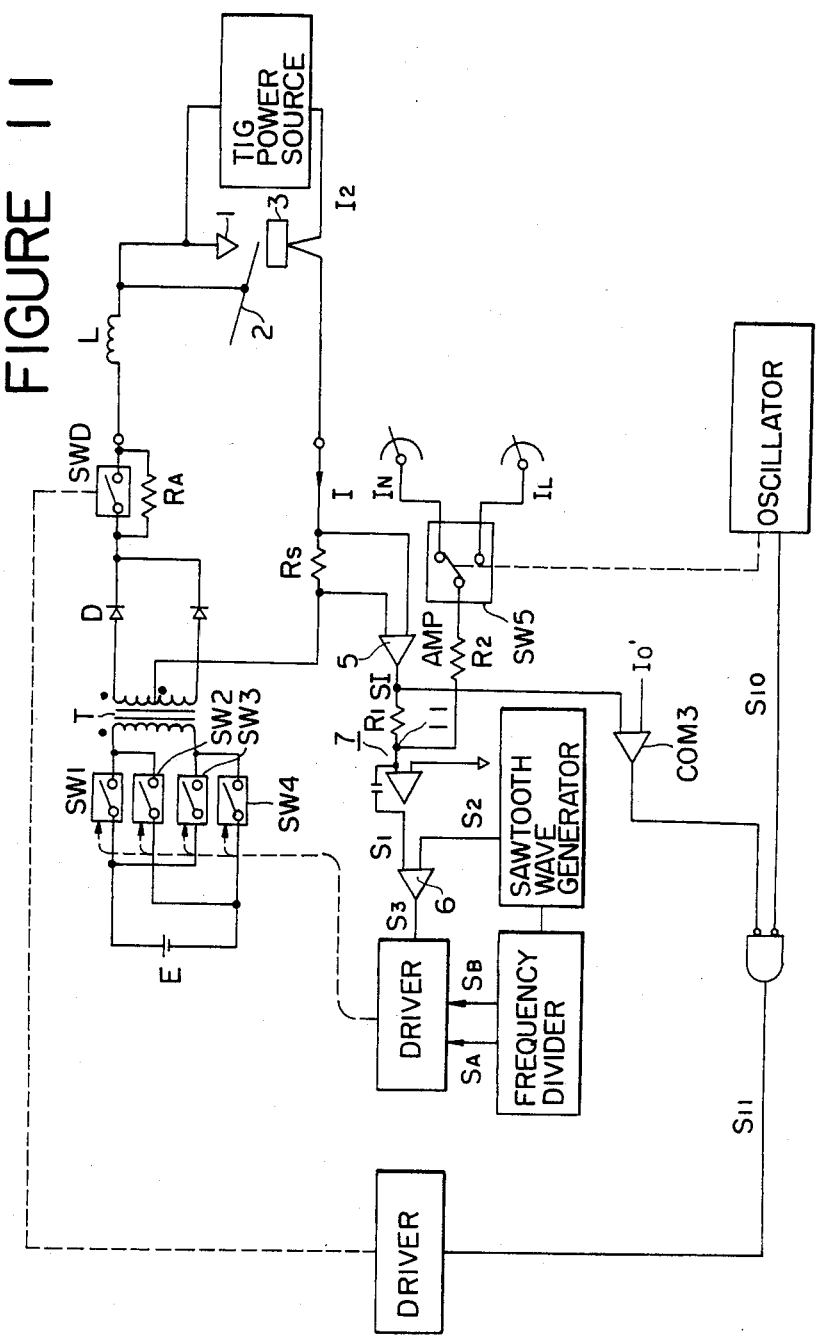
FIG. 11 is a block diagram of a power supply according to the invention, for use in TIG welding.

Referring to FIG. 11, there is shown a further embodiment of the invention, which has a construction similar to the embodiment of FIG. 4 for a consumable electrode arc welding. In FIG. 11, a non-consumable electrode is supplied with current I2 from a separate TIG power source. A wire 2 which is supplied with current I from the power supply of the invention is fed toward an arc which is generated across a gap between a torch 1 and a work 3. The power supply includes an oscillator which presets the frequency of oscillation and produces signals of "H" and "L" alternately, and a switch SW5 which is adapted to select a preset high level IH and a preset low level IL when the output of the oscillator is at "H" and "L" levels, respectively. The signal selected by the switch SW5 is fed to an amplifier 7 through resistance R2.

On the other hand, actual current I is detected by a detector resistor Rs and amplified by an amplifier 5 to produce a signal SI. The current signal SI is fed to the amplifier 7 through resistance R1 to turn on and off the switches SW1 to SW4 to maintain an output of a predetermined value in the same manner as in the preceding embodiments. The signal SI is also fed to a comparator COM3 which receives at its other input terminal a signal I'o which is preset slightly above IL. The comaprator COM3 produces an output signal of "L" level with SI is higher than I'o. This signal S7 and a signal S10 from the oscillator are respectively connected to inverting input terminals of AND gate which produces a signal of "H" level when both of its two input signals are "L". Namely, an output of "H" is produced only when the preset value IL is selected and the output current is larger than I'o. In response to this output signal S11, the driver circuit opens the switch SWD, thereby reducing the output current sharply in the same manner as described hereinbefore. Thus, the power supply according to the present invention permits oscillation at a frequency higher than 100 Hz.

It will be understood from the foregoing detailed description that the power supply according to the present invention includes: first switch means consisting of at least one switching element to be turned on and off to control the output current; second switch means adapted to be inserted in a welding current attenuating path when the first switch means is in off-state; and an impedance means consisting of at least one impedance element connected parallel with the second switching means; turning off the first and second switch means to lower the output current sharply at least either in short circuiting condition where an electrode is in contact with a work or upon detection of a premonition of re-arcing, thereby to minimize the current value sharply at the time point of re-arcing to prevent spattering in consumable electrode arc welding. Further, in TIG welding it becomes possible to obtain a weld of high quality through sharp oscillation by turning off the first and second switch means at the time of switching the current to a filler wire from high to low level. It also becomes possible to reduce the loss of electric energy and to suppress ripples by on-off control of the second switch means.

Although the invention has been described and shown by way of specific preferred embodiments, it is to be noted that various modifications and alterations can be made thereto within the scope of the invention as defined in the appended claims.

What is claimed as new and desired to be secured by Letters Patent of the United States is:

1. An inverter type welding power supply control device, characterized in that said control device comprises:
    first switch means for controlling the output current consisting of at least one switching element;
    second switch means, connected in a welding current attenuating path;
    an impedance means consisting of at least one impedance element connected in parallel with said second switch means; and
    means to control said first and second switch means so that said first and second switch means are placed in the off state at the same time to prevent the application of said output current and to further attenuate the current.

2. A method for controlling a consumable electrode inverter type welding power supply, characterized in that said method comprises:
    controlling the output current of said power supply by on-off control of first switch means consisting of at least one switching element;
    controlling a second switch means in a welding current attenuating path to be in the off-state when said first switch is in the off-state, said second switch means having an impednace means consisting of at least one impedance element in parallel with said second switch means; and
    turning off said first and second switch means at least either in short circuiting condition with an electrode in contact with a work or upon detection of a premonition of re-arching;
    so that said output current is no longer supplied and at the same time said impedance means further attenuates said current.

3. A method for controlling a consumable electrode inverter type welding power supply, characterized in that said method comprises:
    controlling the output current of said power supply by on-off control of first switch means consisting of at least one switching element;
    controlling a second switch means in a welding current attenuating path to be in the off-state when said first switch is in the off-state, said second switch means having an impednace means consisting of at least one impedance element in parallel with said second switch means;
    turning off said first and second switch means at least either in short circuiting condition with an electrode in contact with a work or upon detection of a premonition of a re-arcing:

so that said output current is no longer supplied and at the same time said impedance means further attenuates said current; and turning on said second switch means and restarting on-off of said first switch means when the welding current drops below a preset value during an off-period of said switch means.

4. A method for controlling an inverter type welding power supply to be used for arc deflection and wire heating in TIG welding, characterized in that said method comprises:

controlling the output current of said power supply by on-off control of first switch means consisting of at least one switching element;

controlling a second switch means in a welding current attenuating path to be in the off-state when said first switch is in the off-state, said second switch means having an impedance means consisting of at least one impedance element in parallel with said second switch means;

deflecting an arc by alternately switching at least between high and lower values the output current under control of said first switch means; and turning off said first and second switch means at a time point of switching the output current to said lower value.

* * * * *